United States Patent [19]

Vross et al.

[11] Patent Number: 5,873,919
[45] Date of Patent: Feb. 23, 1999

[54] SYSTEM FOR REMOVAL OF NOXIOUS FUMES

[75] Inventors: Anthony R. Vross, Canfield, Ohio; Robert G. Gabelmann, Glastonbury, Conn.; Jeffrey J. Sipos, Redington Shores, Fla.

[73] Assignees: Simon Roofing & Sheet Metal Corp., Boardman, Ohio; Aercology Incorporated, Old Saybrook, Conn.

[21] Appl. No.: 639,024

[22] Filed: Jun. 7, 1996

Related U.S. Application Data

[63] Continuation-in-part of Ser. No. 478,785, Jun. 7, 1995, Pat. No. 5,591,244.

[51] Int. Cl.[6] .............................. B01D 50/00; B67D 5/62; E01C 19/45
[52] U.S. Cl. .............................. 55/315.1; 55/323; 55/356; 55/385.4; 55/418.1; 55/419; 55/467.1; 55/DIG. 10; 126/343.5 A
[58] Field of Search .............................. 55/264, 266, 267, 55/318, 319, 320, 321, 322, 323, 356, 358, 385.1, 385.4, 385.7, 419, 467, 472, 485, 486, DIG. 10, 315.1, 418.1, 467.1; 96/135, 136, 138, 140, 142; 126/343.5 A; 422/169, 182; 454/63, 64, 65, 92, 117

[56] References Cited

U.S. PATENT DOCUMENTS

| | | | |
|---|---|---|---|
| 935,681 | 10/1909 | Obermann | 454/65 |
| 1,801,263 | 4/1931 | Burnette | 126/343.5 A |
| 2,970,351 | 2/1961 | Rice . | |
| 3,581,782 | 6/1971 | Onufer | 141/59 |
| 3,592,614 | 7/1971 | Schmidt | 422/182 |
| 3,675,400 | 7/1972 | Kubsch . | |
| 3,804,079 | 4/1974 | Schrader | 126/343.5 A |
| 3,844,901 | 10/1974 | Roe et al. . | |
| 3,880,143 | 4/1975 | Hart et al. | 126/343.5 A |
| 3,947,215 | 3/1976 | Peterson et al. | 422/182 |
| 3,955,236 | 5/1976 | Mekelburg | 15/314 |
| 3,960,504 | 6/1976 | Griffin | 422/182 |
| 4,033,328 | 7/1977 | Lohman et al. | 126/343.5 A |
| 4,087,333 | 5/1978 | Naevestad . | |
| 4,164,901 | 8/1979 | Everett | 55/318 |
| 4,450,900 | 5/1984 | Natham | 165/42 |

(List continued on next page.)

FOREIGN PATENT DOCUMENTS 3734271   4/1989   Germany .

OTHER PUBLICATIONS

Fume Incineration Systems, Ross Engineering Division, Bulletin No. F1–166, Jun. 1967.
Industrial Wastes, Thermal Research & Engineering Corp., Bulletin 127, May 1972.
Aercology, Inc.—Modular Media Filters—1994.

*Primary Examiner*—C. Scott Bushey
*Attorney, Agent, or Firm*—Sand & Sebolt

[57] ABSTRACT

A system which reduces the transmission of noxious fumes into the surrounding air during the application of a heated liquid roofing product on a roof. A mobile tanker or kettle contains a supply of the heated liquid. The air space within the tanker or vessel above the liquid product communicates with a mobile filtration unit by a first duct. A rooftop carrier for the liquid product has a fume collection hood which communicates with the filtration unit by a second duct. A blower in the filtration unit creates negative pressure which draws the noxious fumes from the tanker or vessel and carrier through the ducts and into and through the filtration unit. The filtration unit has a series of airtight chambers mounted on a mobile truck bed, each containing a different type of filtering medium to remove various components of the noxious fumes as the fumes move through the filtration unit. A burner unit having an open flame incinerates certain oils and gases and vapors within the fumes, after which the super-heated fumes are discharged into an air plenum into which cooler outside ambient air is introduced to cool the fumes prior to the fumes entering the filtration unit.

15 Claims, 6 Drawing Sheets

U.S. PATENT DOCUMENTS

| | | |
|---|---|---|
| 4,512,245 | 4/1985 | Goldman . |
| 4,563,943 | 1/1986 | Bortelsen . |
| 4,770,088 | 9/1988 | Kistner . |
| 4,804,392 | 2/1989 | Spengler .................................. 55/356 |
| 4,865,628 | 9/1989 | Iwanczyk . |
| 5,004,483 | 4/1991 | Eller et al. . |
| 5,036,754 | 8/1991 | Simms et al. . |
| 5,050,508 | 9/1991 | Wilson ....................................... 55/267 |
| 5,064,451 | 11/1991 | Phillips . |
| 5,069,691 | 12/1991 | Travis et al. . |
| 5,073,259 | 12/1991 | Solimar ................................... 210/232 |
| 5,160,515 | 11/1992 | Nelson ....................................... 55/267 |
| 5,191,909 | 3/1993 | Nadeau et al. ............................ 135/93 |
| 5,281,246 | 1/1994 | Ray et al. ................................. 55/302 |
| 5,591,244 | 1/1997 | Vross et al. ............................... 55/486 |

SYSTEM FOR REMOVAL OF NOXIOUS FUMES

CROSS REFERENCE TO RELATED APPLICATION

This application is a continuation-in-part of application Ser. No. 08/478,785, filed Jun. 7, 1995, now U.S. Pat. No. 5,591,244.

BACKGROUND OF THE INVENTION

1. Technical Field

The invention relates to a system for reducing noxious fumes during the application of a heated roofing product on a roof. More particularly, the invention relates to a mobile unit in which the noxious fumes are removed from the liquid roofing supply tanker or kettle, and from a rooftop carrier for the liquid roofing product, reducing the escape of the noxious fumes produced by the heated roofing product into the surrounding atmosphere. Even more particularly, the invention relates to such a mobile unit having a filtration unit which collects the noxious fumes and removes the majority of the contaminants contained therein prior to discharging the cleaned fumes into the surrounding atmosphere. Furthermore, the invention relates to a mobile unit having an incineration unit which incinerates and then removes a portion of the contaminants by cooling of the contaminants before passing them through the filtration unit.

2. Background Information

A fume problem exists for roofing companies and their customers during the application of hot roofing materials to a roof for waterproofing the roof. Fumes from roofing tar, asphalt or other bituminous products can contaminate food or beverages, and are potentially hazardous to people inhaling the fumes. The fumes escape at a job site into the surrounding atmosphere from several areas, such as the tanker truck or kettle which holds the heated material to be applied to the roof, and/or the rooftop carrier which holds small amounts of the roofing material on the roof for application of the material by the roofers onto the roof. This problem has been recognized in the industry, and others have attempted to solve the same. For example, U.S. Pat. No. 4,770,088 shows a movable enclosure which moves along the roof and encloses the roofing material application nozzle within the confines of the enclosure to retard the escape of harmful materials and/or noxious fumes into the surrounding atmosphere.

Various other types of filtration units have been used for removing noxious fumes from various types of situations unrelated to the roofing industry, such as shown in U.S. Pat. Nos. 4,450,900, 4,512,245, 4,563,943, 4,804,392, 5,004,483, 5,036,754, 5,069,691, 5,191,909 and 5,281,246. Although these prior art fume removal devices and systems, many of which contain filters for purifying the collected fumes, they are not applicable to the roofing industry since it is necessary that the fume removal system and filtration unit be mobile, enabling the roofer to transport the system rapidly and inexpensively to various job sites in order to be used during the application of the roofing material to the roof.

Furthermore, none of the known prior art filtration systems incorporate an incineration stage, preferably using an open burner flame to convert oils contained within the fumes into dry particulates which then can be readily removed by conventional filter stages.

Furthermore, none of these prior art filtration units incorporate a cooling chamber for cooling heated fumes prior to passing the fumes through the filtration unit to assist and facilitate the removal of noxious materials therefrom.

Thus, the need exists for a system for the removal of noxious fumes during the application of heated roofing material to a roof in which the system is mobile, yet effective for removing the majority of the noxious fumes at a minimum of cost.

SUMMARY OF THE INVENTION

Objectives of the invention include providing a system for the removal of noxious fumes when applying a heated roofing material to a roof wherein the system is mobile and compact, enabling it to be moved between various job sites and positioned in close proximity to the building, often in confined spaces.

A further objective of the invention is to provide such a system which materially reduces the discharge of noxious fumes into the surrounding atmosphere from both the rooftop carrier, which carries a small quantity of the heated material for application to the roof, and from the mobile tanker or kettle, which is usually situated adjacent the building and pumps the heated material to the rooftop carrier located on the roof above.

Another objective of the invention is to provide such a system which includes a mobile filtration unit having a series of filters, each of which removes a particular component from the noxious fumes as the fumes are drawn from the rooftop carrier and tanker or kettle, and through the mobile filtration unit before the fumes are discharged into the surrounding atmosphere.

Still another objective of the invention is to provide such a system in which the filtration unit consists of a series of filters, wherein the various filtering media can be changed to more efficiently remove the various components contained within the noxious fumes of a particular roofing material being utilized on a particular job.

Another objective of the invention is to provide such a system in which the filtration unit can be powered either electrically if a source of electricity is available, or by a fuel-driven engine, such as liquid propane which is usually available on a roofing job site for heating of the roofing material.

A still further objective of the invention is to provide such a system which is relatively compact and mobile, and is easily transported to a job site and set up for operation with a minimum amount of workers and time.

A further objective of the invention is to provide such a system which incorporates a burner or incineration unit upstream from the filtration unit which exposes the incoming fumes to an open flame which incinerates the heavy oils and vapors contained in the fumes and converts them into dry particulates, water vapor and various gases, which are more easily removed by the filtration unit located downstream therefrom.

Another objective of the invention is to provide such a system in which a cooling chamber or air plenum is located adjacent to and upstream from the filtration unit to cool the heated fumes prior to their passing into the filtration unit to further assist in removing various particles and vapors therefrom.

These objectives and advantages of the system of the present invention for the removal of noxious fumes during the application of a liquid roofing product to a roof include a mobile vessel adapted to contain a supply of a liquid roofing product; a mobile filtration unit having an inlet and an outlet; first duct means extending between the vessel and the filtration unit for drawing fumes accumulating above the roofing product within the vessel into the filtration unit; a mobile carrier adapted to hold a quantity of the roofing product on a roof of a building adjacent the vessel and filtration unit; second duct means extending between the carrier and the filtration unit for drawing fumes from the carrier into the filtration unit; and blower means for moving the fumes from the carrier and vessel duct means through the filtration unit to condition the fumes before discharging them into the surrounding atmosphere.

These objectives and advantages are further obtained by the system of the present invention for reducing the transmission of noxious fumes emanating from a material into the surrounding atmosphere, wherein said system includes a vessel adapted to contain a supply of the material; a filtration unit having an inlet and an outlet; duct means for transferring fumes emanating from the material within the vessel into the filtration unit; means for moving the fumes from the vessel and through the filtration unit to condition the fumes before discharging the fumes into the atmosphere; and burner means located between the inlet of the filtration unit and the vessel for heating the fumes to reduce certain portions of the fumes into dry particulates for subsequent removal by the filtration unit.

These objectives and advantages are still further obtained by the system of the present invention for reducing the transmission of noxious fumes emanating from a heated material into the surrounding atmosphere, wherein said system includes a vessel adapted to contain a supply of the material; a filtration unit having an inlet and an outlet; duct means for transferring heated fumes emanating from the material within the vessel into the filtration unit; means for moving the heated fumes from the vessel and through the filtration unit to condition the fumes before discharging the fumes into the atmosphere; and cooling means located between the inlet of the filtration unit and the vessel for cooling the heated fumes to facilitate the removal of certain portions of the fumes by the filtration unit.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
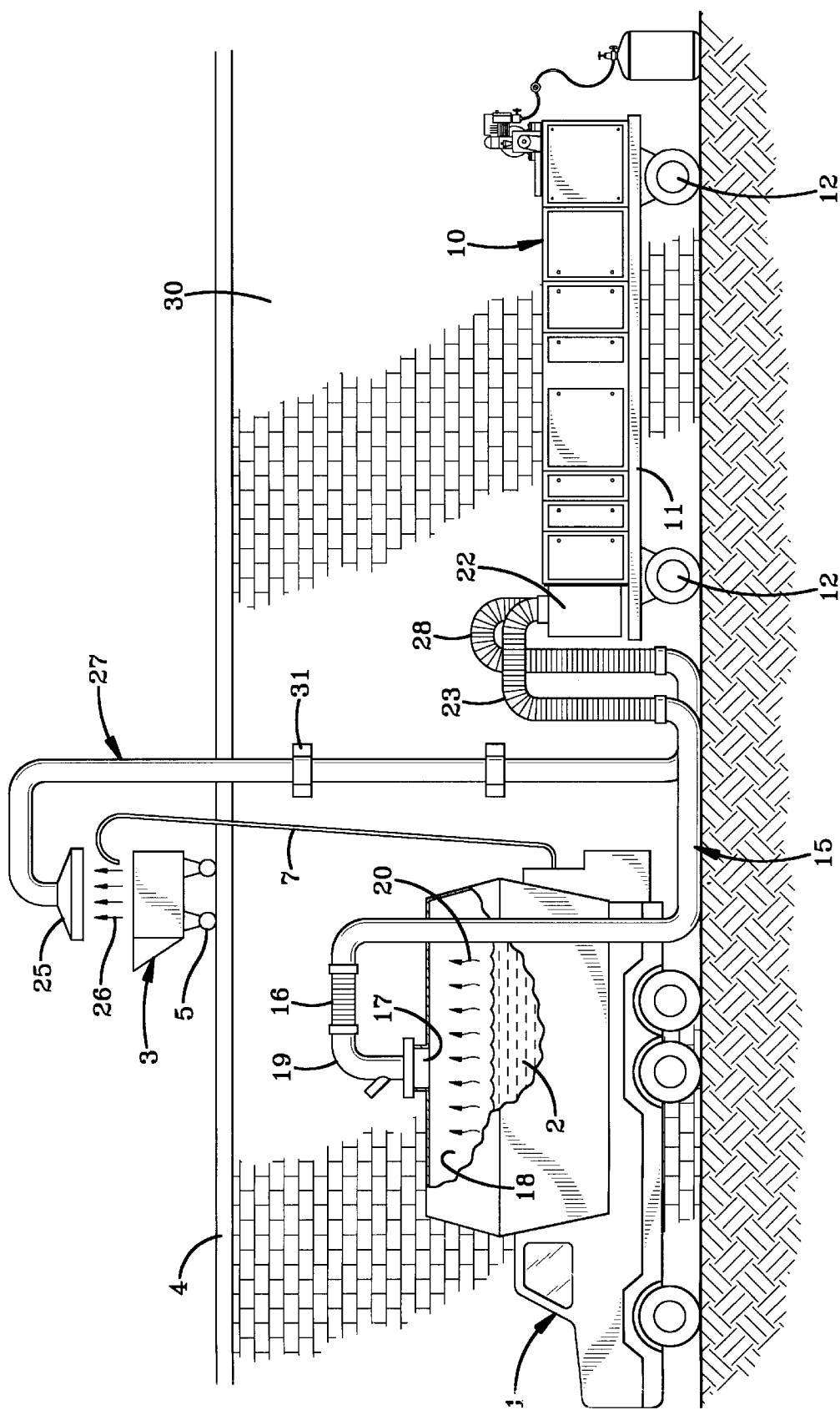
FIG. 1 is a diagrammatic elevational view showing the system of the present invention consisting of a mobile tanker, a filtration unit and a rooftop carrier at a job site.

The system of the present invention for the removal of noxious fumes during the application of a heated roofing material to a roof is shown diagrammatically in FIG. 1. The system includes a usual mobile kettle or roofing tanker, indicated generally at 1, which contains a supply of heated liquid roofing material 2, such as tar or various types of heated bituminous material, which materials are standard and used throughout the roofing industry. A self-contained mobile roofing tanker 1 is shown in the drawings and described below for transporting the material to a job site. However, a usual heated kettle of the type mounted on a trailer and pulled by a separate vehicle can also be used without affecting the concept of the invention. These units are referred to as a mobile vessel.

The improved system further includes a usual rooftop carrier 3 which is movable across a roof 4 on a plurality of wheels 5 for containing a small amount of roofing product 2 in a heated state for application on the roof by the workers as carrier 3 is moved therealong, usually by manually pushing the carrier across the roof. The liquid roofing material will usually be pumped from the mobile vessel into rooftop carrier 3 through a material supply line 7 which extends between the vessel and rooftop carrier.

In accordance with one of the features of the invention, a mobile filtration unit, indicated generally at 10, is in close association with tanker 1 and rooftop carrier 3. Filtration unit 10 includes a flatbed trailer 11 movable by a plurality of pneumatic tire/wheel assemblies 12, enabling it to be easily transported to most job sites. The details of mobile unit 1 are shown particularly in FIG. 2 and are discussed further below.

A conduit, indicated generally at 15, which may include a flexible joint 16, extends into a top opening 17 of tanker 1 to provide communication with air space 18 formed within tanker 1 above liquid roofing material 2. Conduit 15 may include an elbow 19 which extends through opening 17 and is sealed by a substantially fluid-tight seal to prevent the escape of the noxious fumes, indicated at 20, into the surrounding atmosphere. Conduit 15 is connected at the opposite ends to the inlet of a plenum 22 of filtration unit 10, preferably by a flexible section of conduit 23.

In further accordance with the invention, a collection hood 25 will be mounted closely adjacent the open top of rooftop carrier 3 for drawing noxious fumes 26 into the hood and then into a second conduit 27. The collected fumes will be transported into plenum 22 through a flexible elbow 28 or other usual conduit-type of connection. Conduit 27 may be temporarily secured to building 30 by brackets 31, if necessary, depending upon the height of the building and location of filtration unit 10 with respect thereto.

Figure 2:
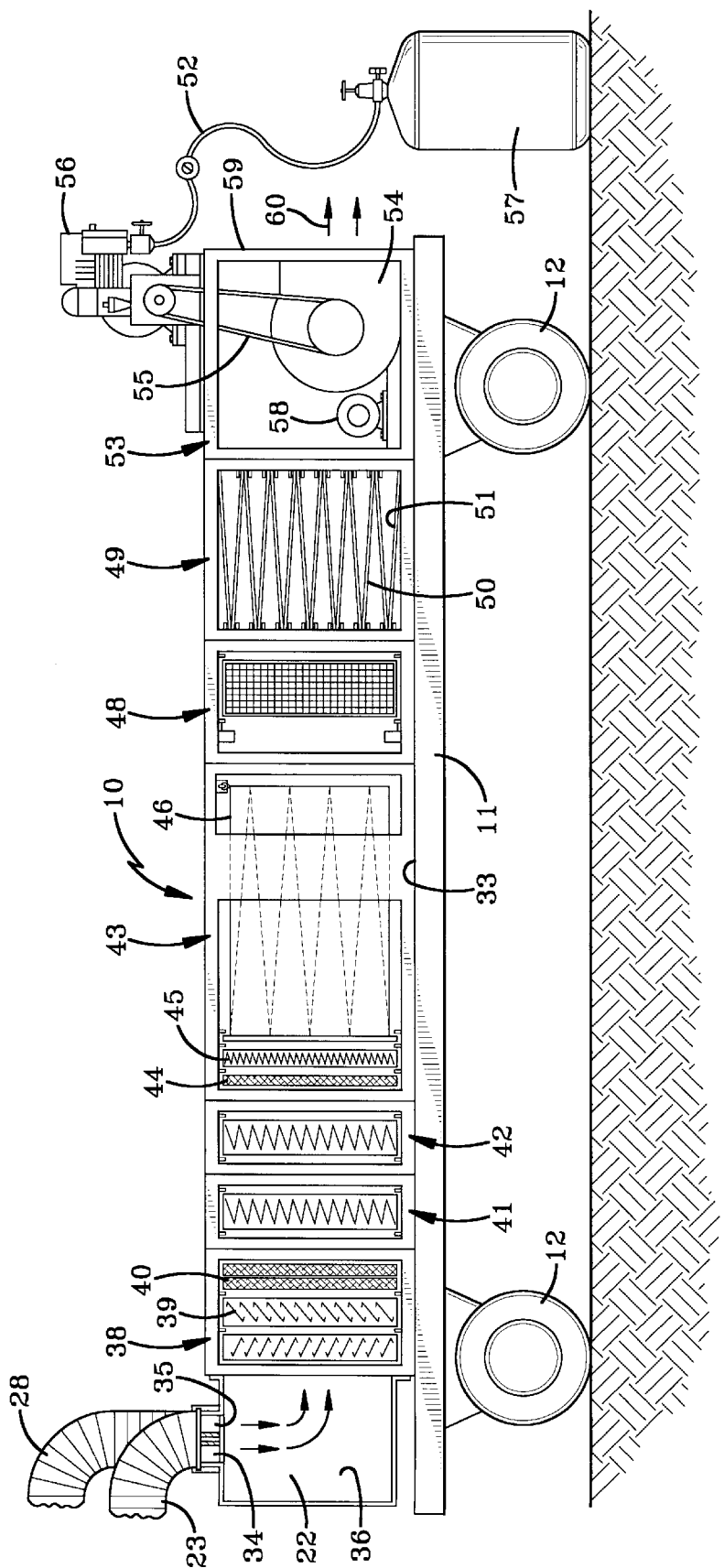
FIG. 2 is an enlarged view of the mobile filtration unit of the system shown in FIG. 1, with the side of the filtration unit being removed to show the various filtering media contained therein.

Referring to FIG. 2, filtration unit 10 includes a number of individual filtration compartments connected in and end-to-end relationship and mounted on and extending along the flat top surface 33 of trailer 11. Each of the filtering compartments or chambers is comprised of a heavy gauge sheet metal frame to form the chamber, which frames are bolted together in the end-to-end relationship. Numerous types of specific-purpose permanent and disposable filters are sequentially installed throughout filtration unit 10. Although the unit is essentially self contained, routine maintenance in the form of cleaning and filter replacement is carried out for efficient operation.

Plenum 22 includes a pair of openings 34 and 35 which communicate with the outlets of conduits 15 and 27, whereby fumes 20 and 26 flow into the hollow interior 36 of plenum 22. A first filtration cabinet 38 is mounted adjacent plenum 22 and is referred to as an impinger module. Its main purpose is the removal of major amounts of airborne oil, grease, and solvent residues. This impinger module will contain a series of impingers 39 formed of sheet metal, and an aluminum mesh filter 40. The next two filtration chambers, indicated at 41 and 42, referred to as multi-vee cabinets, are used as pre-filters for larger particulates in dry or slightly wet vapors of gas or dust. These filters usually contain a disposable treated paper filter medium.

The next filtering chamber, indicated at 43, is intended for the filtering of oil mist and smoke fumes. Filter module 43 includes an initial aluminum mesh filter 44 at the inlet end thereof, a treated paper filter 45, and vee bags 46, which collect any particles passing through the other filters. The next filtering cabinet is referred to a HEPA cabinet 48, and functions as a secondary fine filter for smoke films and soot. It will contain a fine particulate air filtering material, which in the preferred embodiment is rated 99.97% efficient at 0.3 microns. The final filtering cabinet or module, indicated at 49, is a carbon filter. It contains a plurality of removable trays 50 containing granular activated carbon 51. This activated carbon will remove odors, gases and vapors remaining in the fumes after the fumes leave HEPA chamber 48.

The final chamber or compartment, indicated at 53, is the blower module. It contains a blower housing 54 containing a usual internal blower (not shown), which is connected by a drive belt 55 to an internal combustion engine 56. Engine 56 may be gasoline driven, or in the preferred embodiment, is connected to a tank of liquid propane 57 by a regulated fluid supply line 52. Alternatively, if a supply of electricity is readily available, a usual electric drive motor 58, which is also mounted within blower module 53, may be connected by a drive belt to blower housing 54 for rotating the internal blower. The blower draws air from plenum 22 through the various filtering modules and through an outlet opening 59 and into the surrounding atmosphere. The vapors being discharged, as shown by arrows 60, are relatively free of most harmful particulates, odors and other noxious contaminants. The blower will create a negative pressure within filtration unit 10, as well as within top air space 18 of tanker 1, and within hood 25 adjacent rooftop carrier 3, in order to draw the noxious fumes through conduits 15 and 27 and into plenum 22 of filtration unit 10 for filtration before being discharged to the atmosphere through outlet opening 59.

A typical site setup, shown particularly in FIG. 1, will position the filtration unit 10 on level solid ground near tanker 1 adjacent the side of the building, wherein the application of a heated roofing material is desired. The various lengths of flexible conduits forming conduits 15 and 27 will be connected between the inlets of plenum 22 and tanker 1 and rooftop carrier 3. The particular configuration and makeup of the individual conduits can vary depending upon the particular job site and the length of conduit needed to extend between filtration unit 10, tanker 1 and rooftop carrier 3. Hood 25 preferably is positioned approximately two feet above the opening of the rooftop carrier, whereas the cover on tanker 1 preferably forms an airtight closure with the conduit. Each of the filtration modules preferably has an access door (not shown) which is closed and latched in a generally airtight condition upon startup, after the various filtering media contained therein are checked and are in a clean state from a previous roofing job site.

The particular filtering arrangement of filtration unit 10 described above has been found to provide the most desired sequence of filters, with the individual filters thereof being of the particular type described above. These filtration modules preferably are of the type manufactured and sold by Aercology, Inc. of Old Saybrook, Conn., which are identified under its trademark "Modular Media Filters". The size of the various modules and particular filtering media contained therein will depend upon the particular tanker size, blower motor, and job applications with which the mobile system will be utilized.

Figure 3:
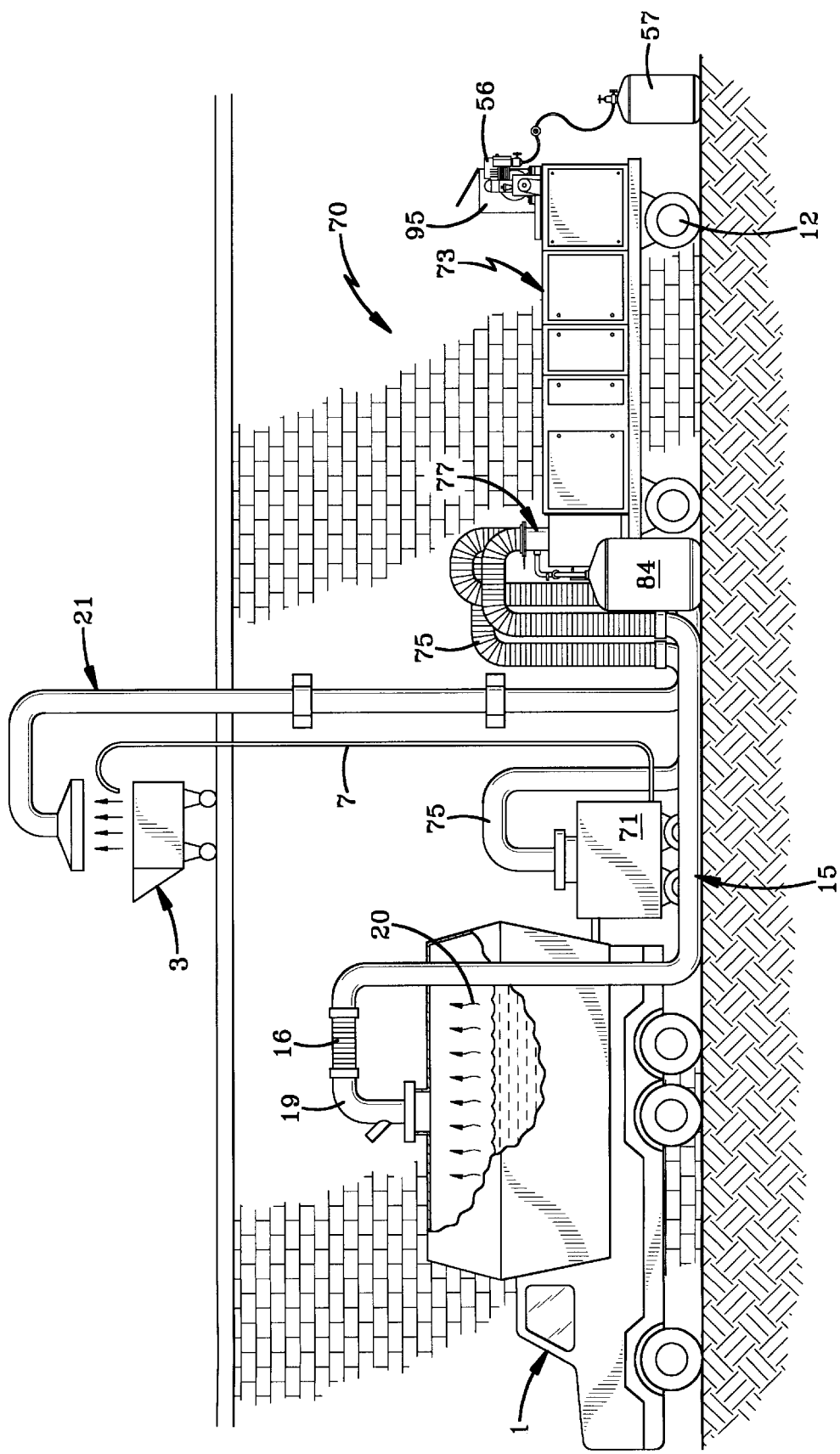
FIG. 3 is a diagrammatic elevational view similar to FIG. 1 showing a modified system of the present invention including a mobile tanker, a filtration unit, a heating kettle, and a rooftop carrier at a job site.
Figure 4:
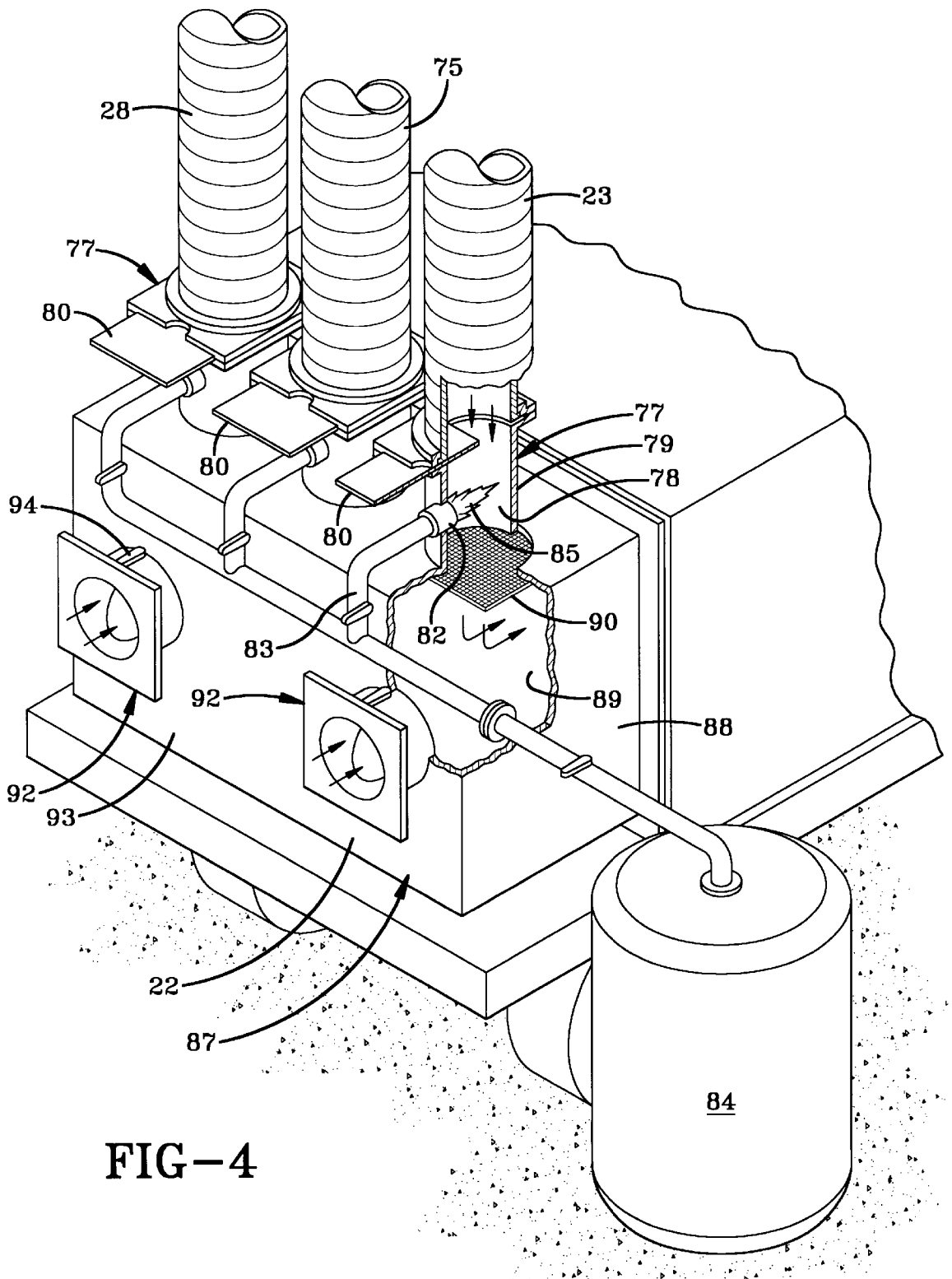
FIG. 4 is an enlarged fragmentary view with portions broken away and in section showing a burner unit and a cooling unit mounted at the inlet of the mobile filtration unit.

A second embodiment of the improved filtration system is indicated generally at 70 and is shown in FIG. 3. Embodiment 70 is similar in many respects to the system described above and shown in FIGS. 1 and 2. One of the differences is the use of a third mobile vessel or heating kettle 71 which can either receive heated material from tanker 1 for subsequent transfer to rooftop carrier 3 through supply line 7, or could receive cold solidified blocks of bituminous material therein for subsequent heating and liquification before supplying the hot bituminous liquid to rooftop carrier 3. System 70 includes a modified filtration unit 73, shown in further detail in FIGS. 4 and 5. Filtration unit 73 includes a third flexible conduit or duct 75 which extends between kettle 71 and filtration unit 73 for transferring heated fumes accumulating in the kettle toward filtration unit 73.

In accordance with one of the features of embodiment 70, a burner unit, indicated generally at 77, is located between each incoming fume duct and the filtration unit. Each burner unit (FIG. 4) is preferably similar to each other and includes a burner chamber 78 formed within a cylindrical housing 79. A slide gate valve 80 preferably is incorporated into housing or casing 79 for regulating the amount of incoming fumes entering into the burner chamber.

Each burner unit 77 further includes a burner 82 which is connected by a fuel pipe 83 to a source of fuel 84, such as LP gas. Burner 82 and the fuel source 84 produce an open flame 85 within burner chamber 78 for incinerating certain of the oils and gases contained within the incoming fumes, reducing the same to particulate material for subsequent removal by the filtration unit.

In accordance with another feature of the invention, a cooling unit, indicated generally at 87, is located downstream of the burner units at the inlet of the filtration unit. Cooling unit 87 is formed by a rectangular-shaped generally airtight housing 88, which has a hollow interior 89, which forms plenum 22 for receiving the superheated incoming fumes from burner chambers 78. A heat-resistant screen 90 forms a heat barrier between each of the burner chambers 78 and the hollow interior 89 of cooling plenum 22.

In further accordance with the invention, a plurality of ambient air inlet units 92 are mounted on the front wall 93 of housing 88. Each air inlet includes an adjustable valve or damper 94 for regulating the amount of outside ambient air which enters plenum 22.

Thus, the incoming heated fumes from the material, such as a hot bituminous product, is exposed to open flames 85 which incinerates certain portions of the incoming fumes, changing the same into particulate material which is better able to be removed by the filtration unit or which is deposited in and subsequently removed from the bottom of housing 88. The super-heated fumes then enter plenum 22 where it expands and is cooled, preferably by mixing it with the cooler outside ambient air which enters the plenum through air inlet units 92. For example, the heated fumes which accumulate within the upper portion of tanker 1 may be 250° F., with the fumes in ground kettle 71 being approximately 350° F. and the fumes from the rooftop carrier 3 being about 250° F. These heated fumes are then heated even further when exposed to open flames 85. It has been discovered that the cooling of the fumes to a significantly lower temperature, for example, 110° F. or less, increases considerably the efficiency of the filtration unit.

Figure 5:
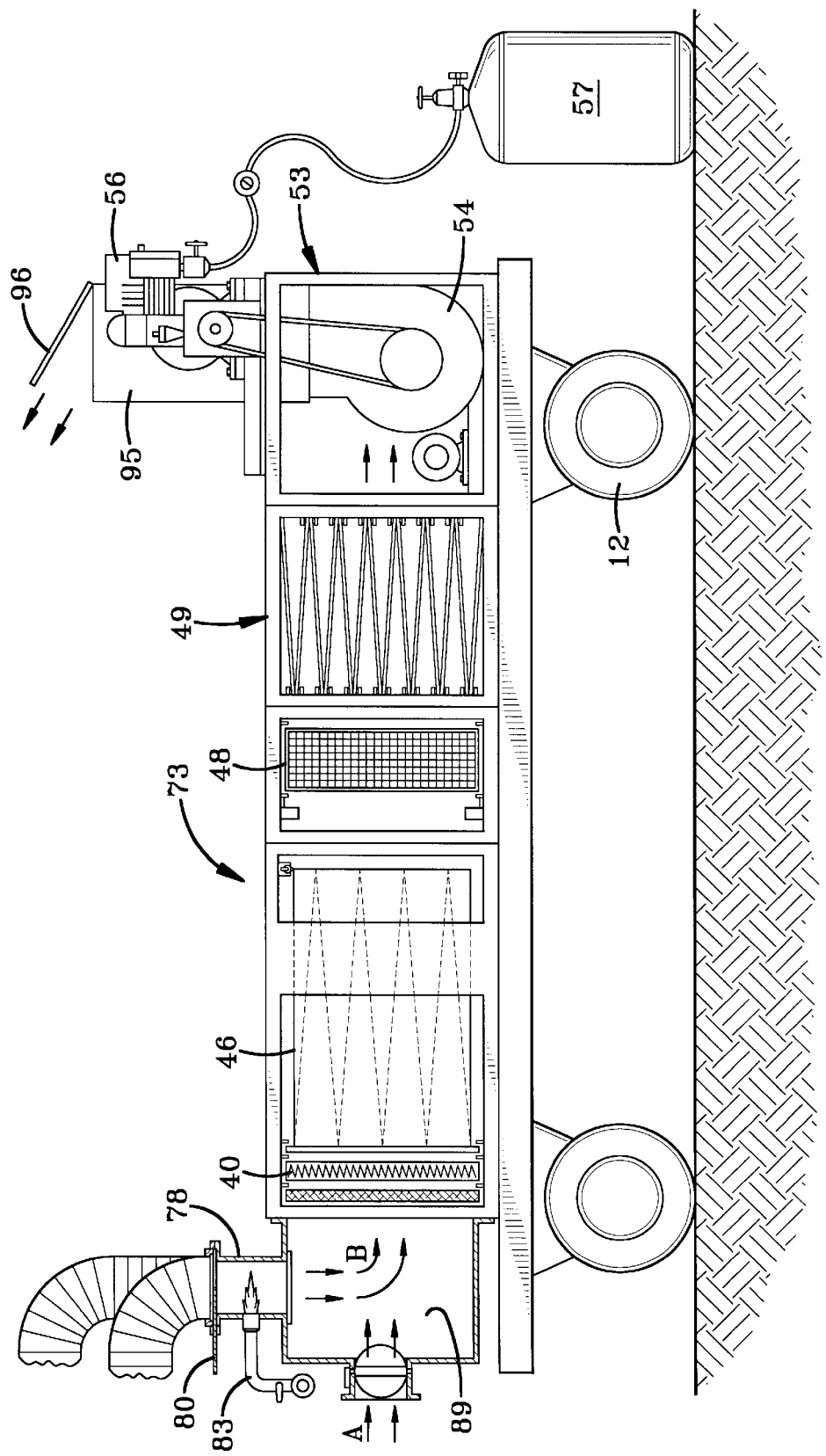
FIG. 5 is an enlarged view of the modified mobile filtration unit of the system shown in FIG. 3, with portions in section, and with the side of the filtration unit being removed to show the various filtering media contained therein.

FIG. 5 shows in further detail modified filtration unit 73 which, due to the incineration of certain of the contaminants within the incoming stream of heated fumes, enables a less expensive, more compact filtering unit to be utilized than that shown in FIGS. 1 and 2. Filtration unit 73 includes an initial aluminum mesh filter 40, and adjacent vee-bags for collecting much of the particulate materials. The fumes then pass through HEPA filter 48 for further filtering the fine particulate materials from the stream, prior to the stream passing through filtered carbon filter 49. The filtered fumes then enter into blower module 53 containing a blower which discharges the treated fumes through an exhaust stack 95 which may have a hinged lid 96 mounted thereon. Thus, the exhausted treated fumes are substantially free of harmful contaminants. Engine 56, which powers the blower, is connected to a fuel supply 57, as discussed previously. The blower forms a negative pressure within the filtration unit for drawing the ambient cooling air, indicated by arrow A (FIG. 5), into cooling plenum 22, as well as drawing the heated fumes, indicated by arrow B, through the various ducts into and through burner chambers 78, where the heated fumes are cooled before being drawn through the filtration unit and being discharged through the blower and out of exhaust stack 95 and into the surrounding atmosphere.

By controlling burner unit slide gate valves 80 and ambient air intake dampers 94, the most efficient cooling of the fumes and subsequent filtration thereof can be achieved to provide a highly efficient filtration system for trapping and removing the harmful particles, gases, vapors, etc. from the fumes before they are discharged into the surrounding atmosphere.

Figure 6:
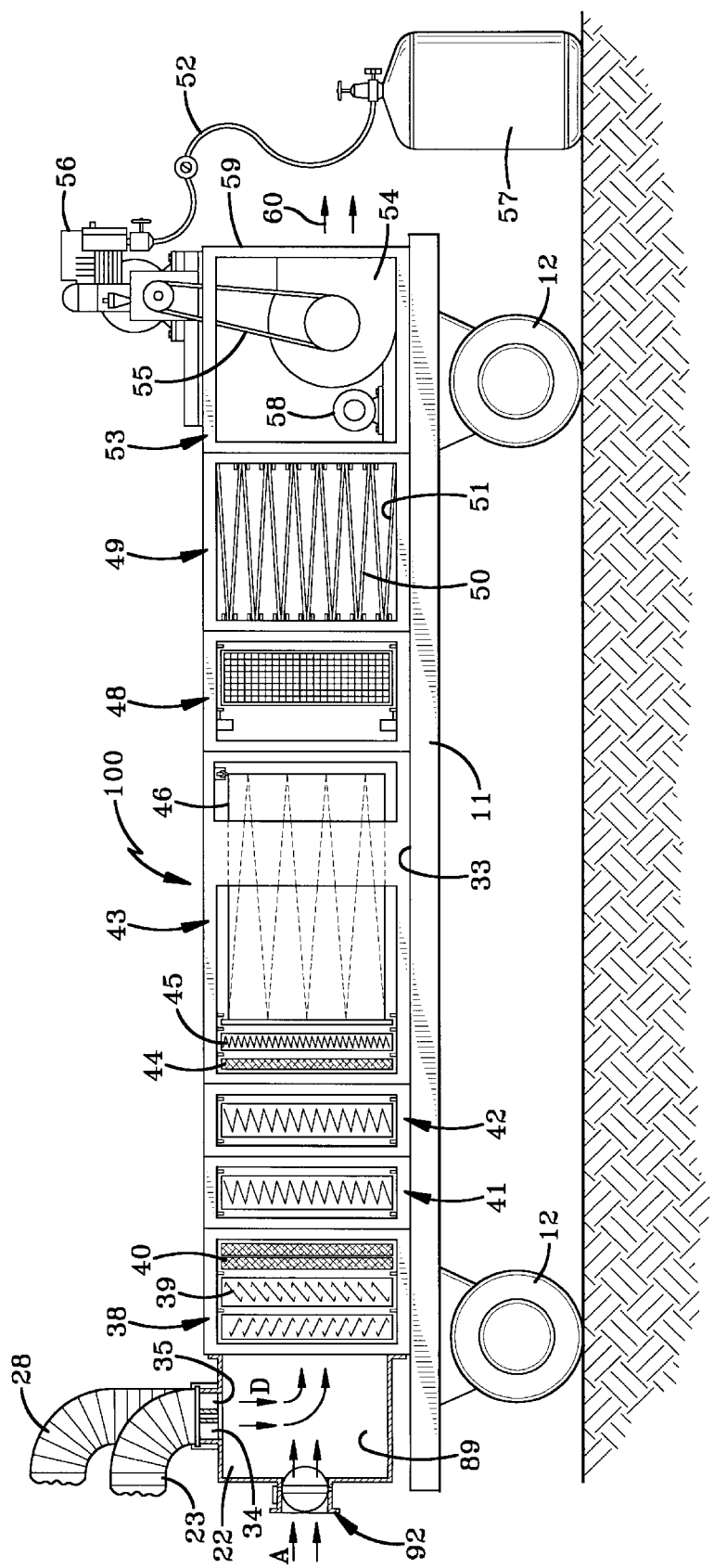
FIG. 6 is a diagrammatic elevational view with portions broken away and in section showing a further modified filtration unit.

A third embodiment of the improved filtration system is indicated generally at 100 and is shown in FIG. 6. Filtration unit 100 is similar to filtration unit 10, shown in FIG. 2, with the main difference being the addition of a plurality of cooling air intake units 92 in combination with cooling plenum 22. In the embodiment of FIG. 6, the heated incoming fumes, indicated by arrow D, are not passed through a burner unit prior to being discharged into plenum 22 where they are cooled by the incoming ambient air before being drawn through the filtration unit by the negative pressure created by the blower unit. The cool air is then mixed with the heated fumes to facilitate condensation of the slower-moving heated gases or fumes in the plenum to assist in cooling the fumes, as well as solidifying certain of the components therein into particulate materials which can then be more easily removed by the various filters within the filtration unit.

Accordingly, the various filtration units and system described above are used for industrial, commercial and residential applications, such as for reducing the emission of bituminous fumes and odors into the surrounding atmosphere by capturing the fumes at their source at the ground and roof levels and then filtering them to remove most of the contamination prior to their release back into the atmosphere. This system significantly reduces the transmission of these fumes to both personnel and the environment. The system preferably is utilized during the installation of bituminous roofing products to reduce the transmission of fumes and odors inherent in these processes to both personnel and environment. However, the system and filtration units can be used for filtering other fumes, both initially heated or unheated, occurring from sources other than bituminous roofing products without affecting the concept of the invention. Likewise, burner unit 77 may be incorporated into the filtration unit to assist in removing certain gases, oils and vapors contained in a particular incoming fume stream to increase the efficiency of the filtration unit. Likewise, the introduction of outside ambient air to cool the heated fumes, whether heated at the material source or in combination with the burner units, further increases the efficiency of the filtration unit.

It has been found that the incineration provided by burning unit 77 will reduce a series of heavy oils and vapors into lighter, dryer and more readily removed particulates. Likewise, the plenum may be used as a settling area for larger ash particulates resulting from the combustion products within burner chambers 78. This incineration process is then facilitated by the introduction of cooling air into the plenum and the sudden slowing of fume velocity when entering the larger volume of the plenum chamber.

Accordingly, the system of the present invention for removal of noxious fumes is simplified, provides an effective, safe, inexpensive, and efficient system which achieves all the enumerated objectives, provides for eliminating difficulties encountered with prior systems, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved system is constructed and used, the characteristics of the construction, and the advantageous, new and useful results obtained; the new and useful structures, devices, elements, arrangements, parts and combinations, are set forth in the appended claims.

We claim:

1. A system for reducing the transmission of noxious fumes emanating from a supply of liquid roofing material into the surrounding atmosphere during the application of a liquid roofing product, said system including:

a mobile vessel adapted to contain a supply of liquid roofing material;

a filter having an inlet and an outlet;

duct means for transferring fumes emanating from the material within the vessel into the filtration unit;

means for moving the fumes from the vessel and through the filtration unit to condition the fumes before discharging the fumes into the atmosphere; and burner means located before the filter and between the inlet of the filter and the vessel for receiving unfiltered fumes and for heating the fumes to reduce certain portions of the fumes into dry particulates for subsequent removal by the filter.

2. The system defined in claim 1 in which the burner means includes a burner chamber communicating with the duct means for receiving the fumes from the vessel, and at least one burner for emitting a flame into said burner chamber.

3. The system defined in claim 2 further including a cooling chamber located between the burner chamber and filter for cooling the fumes before said fumes enter the filter.

4. The system defined in claim 3 including a flame barrier mounted between the burner chamber and cooling chamber.

5. The system defined in claim 2 including a supply of combustible material communicating with the burner for producing the flame within the burner chamber.

6. The system defined in claim 2 in which a plurality of duct means communicate with the filter for drawing fumes from a plurality of material sources toward said filter; and in which at least one burner is associated with each duct means for producing a separate flame for each incoming source of fumes.

7. The system defined in claim 4 in which the flame barrier is a heat-resistant metal screen.

8. A system for reducing the transmission of noxious fumes emanating from a material into the surrounding atmosphere, said system including:
   a vessel adapted to contain a supply of the material;
   a filtration unit having an inlet and an outlet;
   duct means for transferring fumes emanating from the material within the vessel into the filtration unit;
   means for moving the fumes from the vessel and through the filtration unit to condition the fumes before discharging the fumes into the atmosphere;
   burner means located between the inlet of the filtration unit and the vessel for heating the fumes to reduce certain portions of the fumes into dry particulates for subsequent removal by the filtration unit, said burner means including a burner chamber communicating with the duct means for receiving the fumes from the vessel, and at least one burner for emitting a flame into said burner chamber; and
   a cooling chamber located between the burner chamber and filtration unit for cooling the fumes before said fumes enter the filtration unit, said cooling chamber including a substantially air-tight housing formed with at least one opening in an upper portion thereof communicating with the burner chamber for receiving the fumes from said burner chamber whereby the flame is located adjacent said one opening for separating the burner chamber from the cooling chamber.

9. The system defined in claim 8 in which at least one air intake opening is formed in the cooling chamber housing for admitting outside ambient air into said chamber for cooling the fumes entering said cooling chamber from the burner chamber.

10. The system defined in claim 9 including adjustment means for regulating the amount of outside ambient air entering the cooling chamber through the air intake opening.

11. The system defined in claim 8 including adjustment means communicating with the burner chamber for regulating the amount of fumes entering said burner chamber.

12. The system defined in claim 11 in which the adjustment means is a slide gate valve.

13. A system for reducing the transmission of noxious fumes emanating from a heated material into the surrounding atmosphere during the application of a liquid roofing product, said system including:
   a mobile vessel adapted to contain a supply of liquid roofing product and having a first frame for supporting the vessel;
   a mobile filtration unit separate from the vessel and having a plurality of filters, having a first and a second end wherein an inlet is positioned adjacent the first end and an outlet is positioned adjacent the second end, and whereby fumes move through the filtration unit from the first end toward the second end and having a second frame for supporting the filtration unit distinct from the first frame;
   duct means for transferring heated fumes emanating from the roofing product within the vessel into the filtration unit;
   means for moving the heated fumes from the vessel and through the filtration unit to condition the fumes before discharging the fumes into the atmosphere;
   cooling means located between the inlet of the filtration unit and the vessel for cooling the heated fumes to facilitate the removal of certain portions of the fumes by the filtration unit including a cooling chamber communicating with the duct means and filtration unit for receiving the heated fumes from the vessel, and at least one air intake opening for supplying outside ambient air into the cooling chamber for cooling the heated fumes before said fumes enter the filtration unit; and
   burner means located between the cooling chamber and the duct means for converting certain portions of the heated fumes into dry particulates for subsequent removal by the filtration unit.

14. A system for reducing the transmission of noxious fumes emanating from a heated material into the surrounding atmosphere during the application of a liquid roofing product, said system including:
   a mobile vessel adapted to contain a supply of liquid roofing product and having a first frame for supporting the vessel;
   a mobile filtration unit separate from the vessel and having a plurality of filters, having a first and a second end wherein an inlet is positioned adjacent the first end and an outlet is positioned adjacent the second end, and whereby fumes move through the filtration unit from the first end toward the second end and having a second frame for supporting the filtration unit distinct from the first frame;
   duct means for transferring heated fumes emanating from the roofing product within the vessel into the filtration unit;
   means for moving the heated fumes from the vessel and through the filtration unit to condition the fumes before discharging the fumes into the atmosphere;
   cooling means located between the inlet of the filtration unit and the vessel for cooling the heated fumes to facilitate the removal of certain portions of the fumes by the filtration unit including a cooling chamber communicating with the duct means and filtration unit for receiving the heated fumes from the vessel, and at least one air intake opening for supplying outside ambient air into the cooling chamber for cooling the heated fumes before said fumes enter the filtration unit; and
   burner means includes an open flame located within a burner chamber; and in which a flame barrier separates the burner chamber from the cooling chamber.

15. A system for reducing the transmission of noxious fumes emanating from a heated material into the surrounding atmosphere, said system including:
   a vessel adapted to contain a supply of the material;
   a filtration unit having an inlet and an outlet;
   duct means for transferring heated fumes emanating from the material within the vessel into the filtration unit;

means for moving the heated fumes from the vessel and through the filtration unit to condition the fumes before discharging the fumes into the atmosphere;

cooling means located between the inlet of the filtration unit and the vessel for cooling the heated fumes to facilitate the removal of certain portions of the fumes by the filtration unit;

said vessel including a first mobile vehicle having a storage tank adapted to contain the supply of the heated material;

a second mobile vehicle for receiving a supply of the heated material from the first mobile vehicle, and a second duct means extending from said second mobile vehicle to the cooling means for transmitting fumes from said second mobile vehicle to the cooling means; and a heated kettle for receiving and heating material from the first mobile vehicle prior to supplying said material to the second mobile vehicle, and third duct means extending from the heated kettle to the cooling means for transmitting fumes from the material in said heated kettle to the cooling means.

* * * * *